(12) United States Patent
Nasr-Azadani et al.

(10) Patent No.: US 12,106,198 B2
(45) Date of Patent: Oct. 1, 2024

(54) MACHINE LEARNING MODEL ROBUSTNESS AGAINST ADVERSARIAL ATTACKS IN PRODUCTION

(71) Applicant: Accenture Global Solutions Limited, Dublin (IE)

(72) Inventors: Mohamad Mehdi Nasr-Azadani, Menlo Park, CA (US); Andrew Hoonsik Nam, San Francisco, CA (US); Matthew Kujawinski, San Jose, CA (US); Teresa Sheausan Tung, Tustin, CA (US)

(73) Assignee: Accenture Global Solutions Limited, Dublin (IE)

( * ) Notice: Subject to any disclaimer, the term of this patent is extended or adjusted under 35 U.S.C. 154(b) by 810 days.

(21) Appl. No.: 17/153,258

(22) Filed: Jan. 20, 2021

(65) Prior Publication Data

US 2021/0224425 A1 Jul. 22, 2021

Related U.S. Application Data

(60) Provisional application No. 62/966,410, filed on Jan. 27, 2020, provisional application No. 62/963,961, filed on Jan. 21, 2020.

(51) Int. Cl.
| | |
|---|---|
| *G06F 7/04* | (2006.01) |
| *G06F 21/64* | (2013.01) |
| *G06N 5/01* | (2023.01) |
| *G06N 5/04* | (2023.01) |
| *G06N 20/20* | (2019.01) |
| *H04N 7/16* | (2011.01) |

(52) U.S. Cl.
CPC ............. *G06N 20/20* (2019.01); *G06F 21/64* (2013.01); *G06N 5/01* (2023.01); *G06N 5/04* (2013.01)

(58) Field of Classification Search
CPC ................................ G06F 21/64; G06N 20/20
USPC .......................................................... 726/26
See application file for complete search history.

(56) References Cited

U.S. PATENT DOCUMENTS

| | | | | |
|---|---|---|---|---|
| 2019/0080089 | A1* | 3/2019 | Chen ...................... | G06N 20/10 |
| 2020/0034665 | A1* | 1/2020 | Ghanta .................. | G06N 20/00 |
| 2020/0374305 | A1* | 11/2020 | Kursun .................. | G06N 5/047 |
| 2021/0073376 | A1* | 3/2021 | Tran ....................... | G06N 3/045 |

* cited by examiner

*Primary Examiner* — Jeffrey C Pwu
*Assistant Examiner* — Samuel Ambaye
(74) *Attorney, Agent, or Firm* — Polsinelli PC (57) ABSTRACT

This disclosure is directed to a generalizable machine learning model production environment and system with a defense mechanism that facilitates safe execution of machine learning models in production by effectively detecting potential known and new adversarial attacks. The disclosed exemplary systems and architectures gather data from the online execution of the machine learning models and communicate with an on-demand pipelines for further inspection and/or correction of vulnerabilities in the production machine learning model to the detected attacks. These systems and architectures provide an automatable process for continuous monitoring of model performance and correction of the production machine learning model to guard against current and future adversarial attacks.

18 Claims, 4 Drawing Sheets

MACHINE LEARNING MODEL ROBUSTNESS AGAINST ADVERSARIAL ATTACKS IN PRODUCTION

CROSS REFERENCE

This application claims priority to U.S. Provisional Patent Application No. 62/966,410 filed Jan. 27, 2020 and U.S. Provisional patent Application No. 62/963,961 filed on Jan. 21, 2020, which are herein incorporated by reference in their entireties.

TECHNICAL FIELD

This disclosure relates to machine learning model production and model protection against adversarial attacks.

BACKGROUND

Machine learning models are trained to extract features and to automate tasks previously attributed to humans with increasing efficiency and accuracy. The machine learning models may be trained and developed based on a set of training data embedded with underlying data correlations, data relationships, and data distributions. A machine learning model in a production environment may be subject to either general adversarial attacks or adversarial attacks targeting particular machine learning models.

DETAILED DESCRIPTION

Defining, building, deploying, testing, monitoring, updating, and protecting machine learning models in a production environment poses a technical challenge on multiple disciplinary levels. For example, addressing the technical challenges that arise to effectively manage machine learning models, maintain their predictive accuracy, and protect them from adversarial attacks in their production environments require a diverse skillset including but not limited to business intelligence, domain knowledge, machine learning and data science, software development, DevOps (software development (Dev) and information technology operations (Ops)), QA (quality assurance), integrated engineering, software development, and/or data engineering.

A machine learning model may be based on any type of regression algorithms, neural networks, or the like. A machine learning model may be designed for processing any type of input data and for generating any type of predictions, such as classification, clustering, data segmentations, pattern recognition, and the like. Regardless of their types, purposes, and inner workings, machine learning models in production may be exposed to security threats in various forms of, e.g., adversarial attacks. Such in-production adversarial attacks may include but are not limited various types including evasion, poisoning, trojaning, backdooring, reprograming, and inference attacks. An adversarial attack may be general-purpose or may specifically target a particular machine learning model or a particular type of machine learning architecture or algorithm. A machine learning model may be built to be safe against some known priori adversarial attacks during the training stage of the machine learning model. However, it is difficult to consider all priori adversarial attacks, and unknown new adversarial attacks that may be developed by hackers after the machine learning model is placed in a production environment. A machine learning model in a production environment thus may be vulnerable to various types of existing and new adversarial attacks.

This disclosure is directed to a generalizable machine learning model production environment and system with a defense mechanism that facilitates safe execution of machine learning models in production by effectively detecting potential known and new adversarial attacks automatically or on-demand, particularly for Deep Neural Networks (DNN) models running in online production pipelines. The disclosed exemplary systems and architectures gather data from the online execution of the machine learning models and communicate with an automatic or on-demand pipeline for further inspection and/or correction of vulnerabilities in the machine learning model to the detected attacks. These systems and architectures provide an automatable process for continuous monitoring of model performance and for model correction in production to guard against automatically detected adversarial attacks as the production machine learning model is being used in real-time.

The generalizable machine learning model production environment may, for example, include a generalizable attack detection engine, a modular adversarial robustness evaluator or clinic (ARC), and dual-mode online and on-demand pipelines for handling live input data including adversarial data. The generalizable detection engine may utilize, for example, an ensemble of adversarial defense techniques and methods to prevent adversarial data samples from reaching the machine learning model in production and from leading the machine model in production to generate misleading/harmful prediction results. The ARC that may be implemented as part of the on-demand pipeline, may include components which inspect and correct issues with the data and the machine learning model with respect to its weaknesses against adversarial attacks. The ARC may be designed to be modular so that multiple domain-specific ARCs can be implemented via the on-demand pipeline. The dual-mode online and on-demand pipelines are designed such that the production system is capable of handling live data processing for the machine learning model execution in an online production mode while the inspection and correction of the data and model is handled on-demand. For example, the production system may handle adversarial live data by routing the live data stream to one or more on-demand pipeline(s) via the detection engine for adversarial attacks. The on-demand pipeline(s) may then use the ARC to improve the robustness of the online machine learning model to future adversarial attacks. While the disclosure below focuses on example on-demand pipelines for providing robustness of the production machine learning model against adversarial attacks, the function of components such as the ARC may alternatively be continuously and/or automatically implemented, or executed on preconfigured schedule (e.g., periodically). The term "live data" may be alternatively referred to as "streaming data" or "live streaming data", and is used to generally refer to data as being collected and input to the machine learning model deployed in production. For example, live input data may include characteristic data of users and online advertisement presented to the users while the users are surfing online content.

Figure 1:
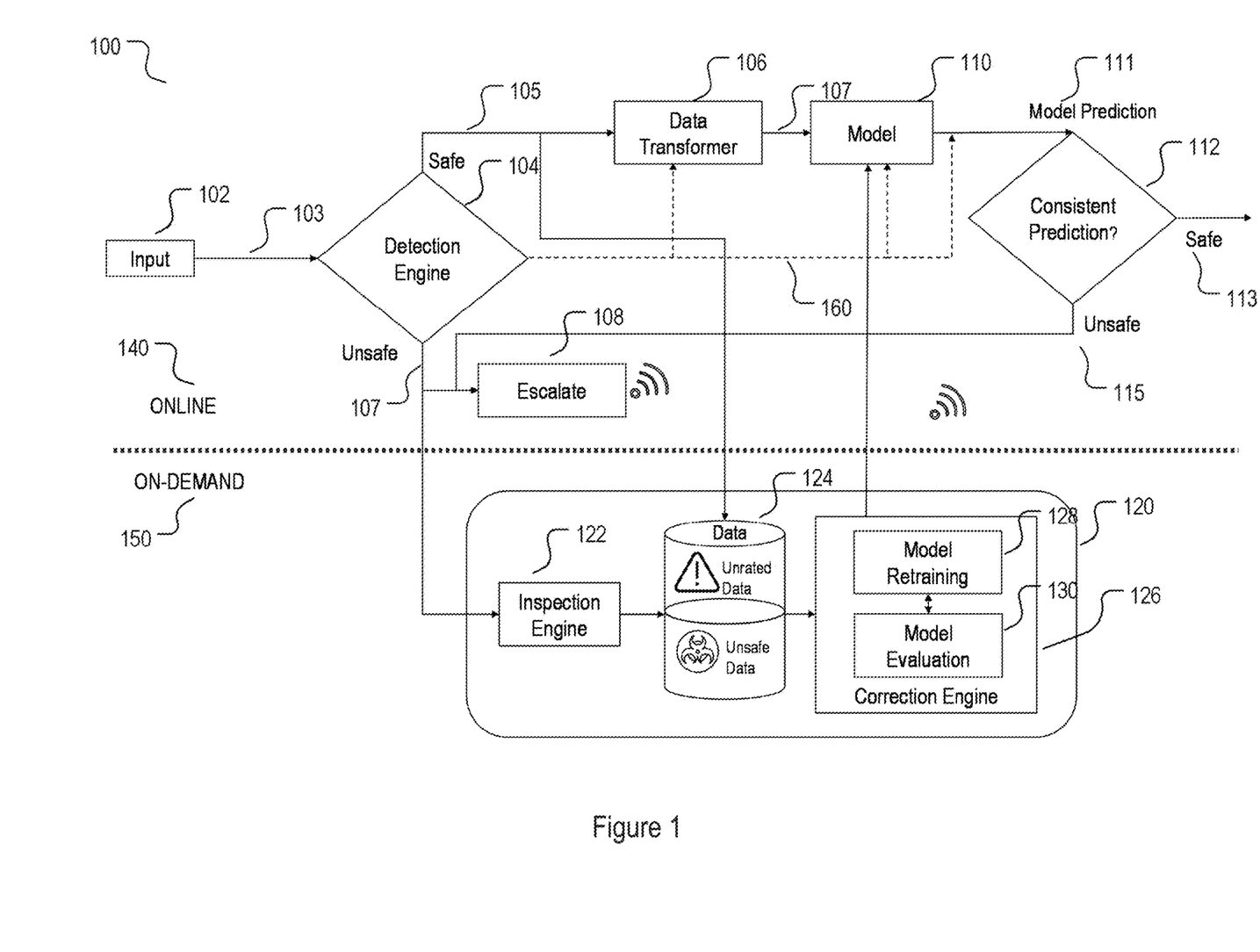
FIG. 1 illustrates a data/logic flow and block diagram for an exemplary machine learning model production system.

FIG. 1 shows a data/logic flow and system architecture for an exemplary machine learning production system 100 capable of detection of both known and new adversarial attacks and on-demand model evaluation and correction. The system may include a detection engine (DE) 104 for adversarial attacks, a data transformer 106 (DT, which may be optional), a main machine learning model 110 deployed in production environment, a consistency engine (CE) 112 (which may be optional), an escalator 108, and an ARC 120. As merely an example, these components may be interconnected as shown in FIG. 1. As further shown in FIG. 1, the system 100 may be delineated into an online pipeline 140 and an on-demand pipeline 150, with further details provided in the description below. The online pipeline 140 may be capable of handling live input data stream 102 while the on-demand pipeline 150 may be invoked to handle inspection of the detected adversarial attacks, evaluation of the main model 110 in production, retraining and correction of the main model in production in response to a certain level and types of adversarial attacks detected by the online pipeline 140. The system 100 shown in FIG. 1 thus provides (1) an automated process for continuous model performance monitoring and handling, and (2) a generalized defense to known and unknown adversarial attacks using information from online execution of the production model to improve model robustness. The exemplary system 100 shown in FIG. 1 is generalizable to different types of machine learning models and different types of live input data. Other modules or engines that are specific for the production model and specific to the type of input data may be added to the system 100 accordingly.

In the machine learning model production system 100 of FIG. 1, detection of adversarial attacks may be handled by online components including the DE 104. The DE 104 may include a generalizable adversarial defense engine. It can be agnostic to data type, model type in production, and configured to support an ensemble of adversarial detection methods and techniques for various known attacks (such as known general-purpose attacks discussed above). In some implementations, the DE 104 may support deploying an ensemble of adversarial attack prevention algorithms and methods to facilitate a robust detection of adversarial attacks of various types. Specifically, a production model may already be robust against adversarial attacks of some types but not against some other types. For example, an image recognition model in production may be robust as trained against known adversarial attacks of type FGSM (Fast Gradient Signed Method) on a dataset, but may not be robust against adversarial attacks of a variety of other types such as a CW (Carlini-Wagner) type of attacks on that dataset. The DE 104 may thus include a plurality or an ensemble of detection algorithms for broad detection of various types of known adversarial attacks.

As shown by 103 of FIG. 1, various live data are collected from various data sources and enter the DE 104. The live input data 102 are further used later in both the online and on-demand pipelines, as shown by arrows 105 and 107, respectively. The live input data 102 that are collected at the DE 104 may include the main data items to be processed by the machine learning model and other metadata or auxiliary data associated with the main data items. The metadata and other auxiliary data may include but are not limited to: data source, data source location, data storage type, data type, and data author. The data storage and data type are not restricted but they may be specified to the system prior to data ingestion in order for the system to communicate with the data sources as well as correctly process the received input data. These data are then processed by the DE 104 to determine whether the incoming data sample is adversarial or not. As shown by 105 of FIG. 1, the DE 104 may determine that a particular input data item/sample is safe and routes the live data item/sample towards the optional data transformer 106. As shown by 107 of FIG. 1, the DE 104 may alternatively determine that the incoming data sample is adversarial and returns an alert via the escalator 108. This alert may be sent via API and may be received by another component of the system 100 or an external system. As further shown by 107 of FIG. 1, the DE 104 may determine that the incoming data sample is adversarial and may submit an API call to the on-demand pipeline 150 for further inspection of the potentially adversarial data by an Inspection Engine (IE) 122 of the ARC 120 and for further correction of issues pertaining to either the detected adversarial data sample or the machine learning model. For that purpose, the DE 104 may collect various data and pass such data to a data store and data management engine 124 of the ARC 120 for use by the IE 122. Such potentially adversarial data detected and collected by the DE 104 may include but are not limited to data source, data source location, data storage type, data type, data author, suspected adversarial attack type, and suspected adversarial data sample(s).

In some implementations, the DE 104 of FIG. 1 may be designed as part of the production system which communicates with other parts of the system or external systems via, for example, RESTful APIs. This allows it to be automatable by the end user for starting the online pipeline 140 if no adversarial data is detected, or sending alerts and triggering designated on-demand pipeline 150 if an adversarial data sample is detected.

As shown in FIG. 1, the online pipeline 140, when configured to handle live input data 102 in real-time, may include three main exemplary phases: a detection phase, a data transformation phase (DT phase), and a model execution phase. Specifically, the online pipeline 140 is invoked when the DE 104 determines that the live data is safe for the main machine model in production 110 to process. If the DE 104 determines that the data is not safe for the production machine learning model 110 to process, data transformation and model execution are not run. Regardless of which decision the DE 104 makes, the data returned by the DE 104 (as discussed above) may be available for storage in the data store (such as 124 of the ARC 120) and for all other stages of the system 100 or external systems to consume via API.

As shown in 103 of FIG. 1, the live input data enter the system and pass through the generalizable DE stage first. From there the DE 104 analyzes the data to determine whether the data is safe or unsafe. As shown in 107 of FIG. 1, if the data is determined by the DE 104 as unsafe, the system runs an automatable escalation via the escalator for sending alerts to users and to other components of the system 100 and for making the data and assessment available, both via, for example, API. Otherwise, as shown in 105 of FIG. 1, if the data is determined by the DE 104 as safe, the online pipeline 140 of FIG. 1 continues to the DT phase. As shown in FIG. 1, in the DT phase, the data transformer (DT) 106 performs a necessary number of transformations of the live data before proceeding to the model execution phase. Such transformations, for example, may include but are not limited to feature squeezing for image data, tokenization for text data, data normalization, outlier handling, or anything else that helps prepare the data for processing by the main machine learning model 110 in production in the model execution phase. As shown by 107 of FIG. 1, the live data processed and transformed by the DT 106 may then be passed to the main machine learning model 110 in production for generating a prediction output 111. The prediction output 111 generated by the main machine learning model 110 may be made available by the system 100 for storage and for consumption by users, other components of the system, and/or external systems via API calls. In some implementations, the DT component 106 may be made optional. More details for the DT component 106 are described below with respect to FIG. 2.

As further shown in FIG. 1, the consistency engine (CE) 112 may be optionally used in the online pipeline 140 as a secondary precautionary adversarial detection engine. Specifically, the prediction output 111 from the main machine learning model 110 in production may be passed to the CE 112. The CE 112 may compare the prediction output 111 against prediction results returned by an ensemble of proxy models of various architectures after processing the same live data 107. As shown in 113 of FIG. 1, if no significant difference between the prediction output 111 of the main model and the proxy models in the CE 112 is observed, the prediction output 111 by the main model 110 may be determined to be safe. Otherwise, as shown in 115 of FIG. 1, the CE 112 may flag the prediction output 111 by the main machine learning model 110 as unsafe and inform the escalator 108 for issuing an alert indicating the that prediction by the main machine learning model is unsafe. This alert, again, may be sent via API to the users, other components of the production system 100, and/or external systems. More details for the operation of the CE 112 are described below with respect to FIG. 3.

Figure 2:
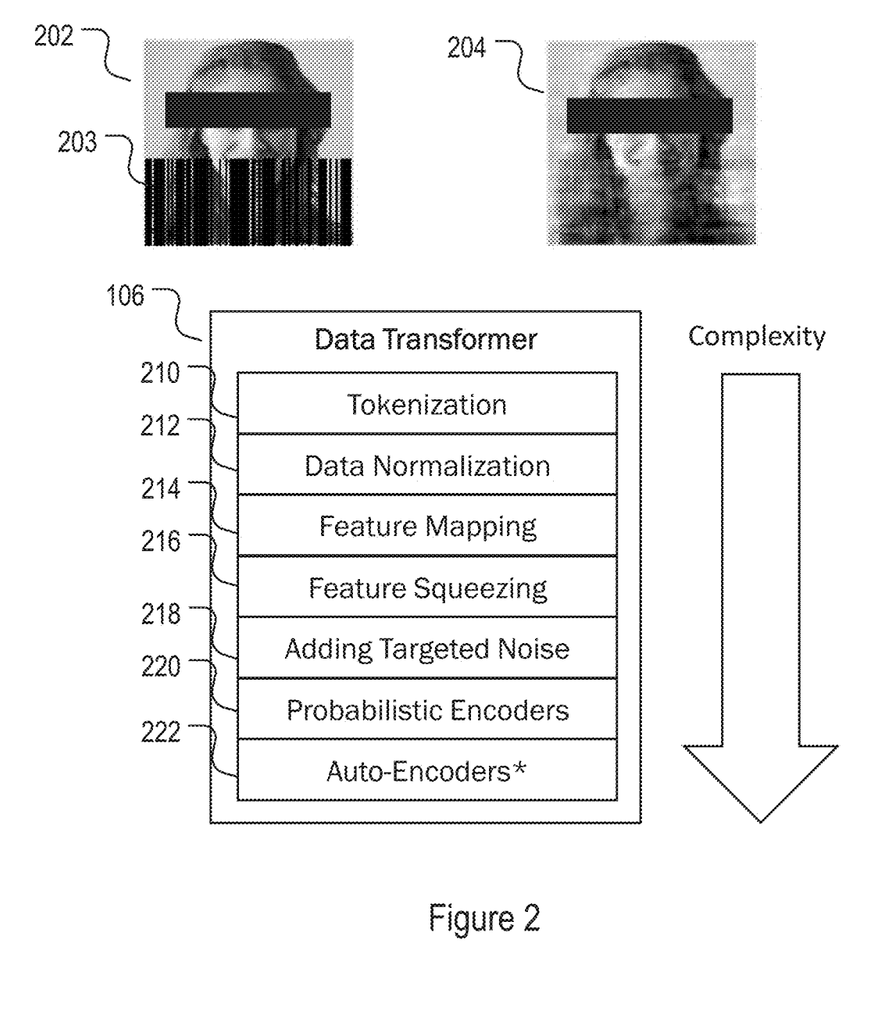
FIG. 2 illustrates an exemplary implementation and functionalities of the data transformer in the exemplary machine learning model production system of FIG. 1.

FIG. 2 further illustrates the functionality of the data transformer (DT) 106 of FIG. 1. FIG. 2 shows an example where the machine learning model is designed to process input images. FIG. 2 further shows an exemplary input image 202 to the production system 100 that is not flagged by the DE 104 as unsafe and is thus passed to the DT 106. The DT 106, while performing the various data transformations using an ensemble of data transformation components, may add another layer of assurance to the DT 106. Specifically, even though it may be preferable that the DT 106 and the ensemble of transformation components therein are designed to be model independent or agnostic to the machine learning model and the data type, the DT 106 nevertheless may be configured to modify (transform, or correct) the input data (input image 202 in the example of FIG. 2) from its original form to a modified form (shown as image 204 in the example of FIG. 2, with an example feature 203 of the image 202 removed) before passing it to the machine learning model, and may thus potentially remove/modify features in the data constituting adversarial attacks not detected (or missed) by the DE 104, thereby reducing the risk that the system 100 is negatively affected by an adversarial attack undetected by the DE 104. Thus, one of the DT's key contributions, besides transforming the data into forms that are more suitable for processing by the main machine learning model 110 in production, include reducing adversarial attack effectiveness for new/unknown adversarial attacks. In particular, when an adversarial attack is new, there may not be a detection method in the ensemble of detection algorithms in the DE 104 to determine that the input data with the new attack is unsafe. Features in the data representing such a new and unseen attack may be removed or modified by the added DT layer. The DT 106, if employed as an option, thus provides an additional layer of protection against adversarial attacks.

Various data transformation and processing techniques may be incorporated in the DT 106 to increase the probability of removing/modifying features representing new adversarial attacks in the incoming live data. The DT 106 may include an ensemble of data transforming algorithms, each designed to handle different types of data transformation and pre-processing, for further increasing the probability of removing/modifying features representing new adversarial attacks in the incoming live data. As an example, FIG. 2 shows a DT 106 having an ensemble of data transformation function/algorithms including a tokenization function/algorithm 210, a data normalization function/algorithm 212, a feature mapping function/algorithm 214, a feature squeezing function/algorithm 216, a function/algorithm 218 for adding targeted noises, a probabilistic encoder 220, and an auto encoder 222. By design, the choice of data transformation functions/algorithms may be such that it does not require heavy training or access to training data (with some exceptions, e.g. auto-encoders) and thus does not significantly increase system cost if the DT 106 is adopted as an option in the production system 100.

Figure 3:
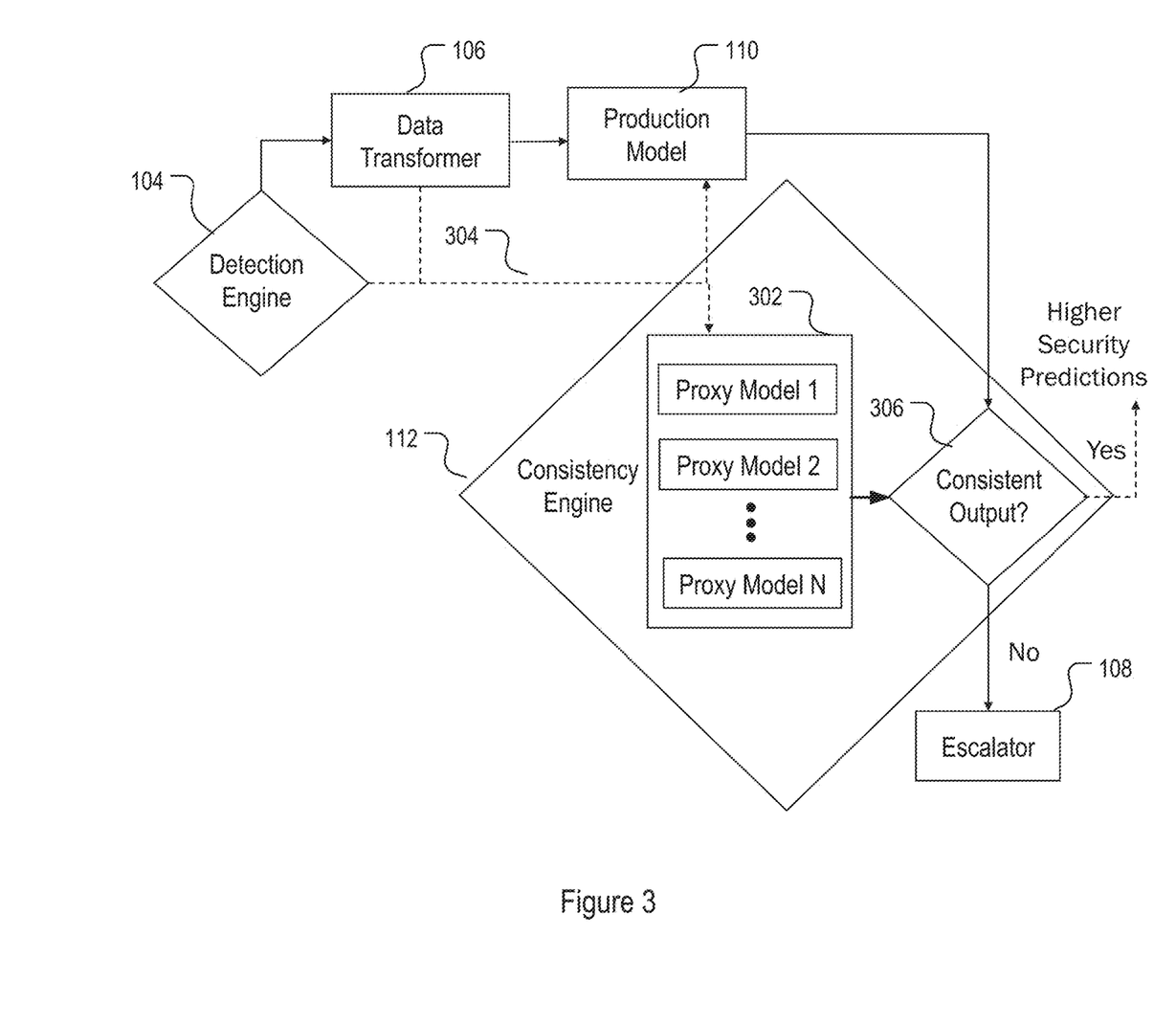
FIG. 3 shows a data/logic flow and block diagram for an exemplary implementation of the consistency engine of FIG. 1.

FIG. 3 provides further details with respect to the consistency engine (CE) 112 component in the online pipeline of FIG. 1. The CE 112 may be provided as an optional component to the machine learning model production system. The CE component 112 may be designed to compare the prediction output 111 of the main model 110 against an ensemble of proxy models trained using different architectures and/or training data. Such a CE component 112 may add a third layer of detection in case a new unknown adversarial attack mechanism is not detected by the DE 104 and is further not removed/modified by the DT 106. Specifically, comparing prediction results from the proxy models of various architectures against the prediction results from the main machine learning model in production for further detection reduces the odds of not leaving such attacks undetected since most unknown/new adversarial attacks by nature depend strongly on the model architecture. By using proxy models in the CE 112 of distinct architectures, an inconsistency may be identified when the input data contain model-specific or architecture-specific attack(s). The proxy models included in the CE 112 may be frequently updated or tuned with different hyper parameters. In some implementations, these proxy models do not need to be as accurate as the main machine leaning model. They only need to be sufficient for verifying and auditing a consistent behavior for the main machine learning model.

As specifically shown in the example of FIG. 3, the CE component 112 may include proxy models 1 to N (represented by 302). The live data may be input to these proxy models with or without data transformation by the DT component, as shown by 304. The comparison between the prediction of these proxy models and the main models may be conducted in 306 using various algorithms involving, for example, various comparison thresholds. In some implementations, any inconsistency among the results may be considered as indication of adversarial attack. In some other implementations, adversarial attack determination may be trigger only when the inconsistency level among the prediction results reaches certain level of inconsistency threshold. Once the CE component 112 determines that the input data contains an adversarial attack, it informs the escalator 108 for issuing an alert to the users, other components of the production system 100, and external systems via API. In some implementations, the CE component 112 may further output a higher security prediction based on the prediction of the main production model 110 and the predictions of the proxy models 302. For example, the higher security prediction may be based on a majority vote using all predictions available.

In the online pipeline described above, the main model in production 110 is responsible for processing safe live input data (as determined by the DE 104) and returns the prediction results. The production model may be managed by a model manager. An example of such a model manager is described in detail in U.S. patent application Ser. No. 14/971,987 (issued as U.S. Pat. No. 10,438,132), filed on Dec. 16, 2015, which is herein incorporated by reference in its entirety. The DE results can be forwarded to any stages in the online pipeline 140 that may be added after the production model execution. This data can be used for evaluating the expected result (from the Detection Engine) versus the actual result (what the model returns, e.g., mis-prediction). An additional step can be used post model execution to perform this evaluation. The additional step may be implemented as part of model manager. The results returned from the production model are made available via API for download by users with access to the system 100. This may also be implemented as part of the model manager.

In FIG. 1, an example breakdown and architectural diagram for the on-demand pipeline of the machine learning production system 100 is illustrated as 150. The on-demand pipeline 150 may be triggered by the generalizable detection engine 104 which, as described above, may be agnostic to the model in production and detects incoming data sample as adversarial above a given confidence threshold.

As shown in FIG. 1, the on-demand pipeline 150 handles further inspection and correction of issues with the input data or machine learning model by model retraining via the ARC 120. The inspection functionalities may be performed by the inspection engine (IE) 122 of FIG. 1 while the correction functionalities may be performed by the correction engine (COE) 126. The COE 126 may be responsible for model evaluation and retraining.

Correspondingly, the COE 126 may further include a model evaluator (ME) 130 and a model retrainer (MR) 128. The ARC 120 may further include a data store and data management (DM) component 124 for facilitating the IE 122 and the COE 126 to perform their functionalities. The ARC 120 may inspect the output of the detection engine 104 and utilize, for example, an ensemble of model correction techniques including but not limited to: removing adversarial data samples for retraining and using one of the proxy models in the consistency engine 112 as the main production model. When a new adversarial attack is discovered either by the DE104 or through the CE 112, the ARC 120 may be triggered to deploy: (1) retrained robust model to replace the main production model 110 in the online pipeline 140; (2) new detection method/algorithm added to the ensemble of detection components in the detection engine 104.

The operation of the on-demand pipeline 150 is described in more detail below. As shown in 103 of FIG. 1, live input data enter the system from some data source. The data storage and data type are not restricted but they are specified to the system prior to data ingestion in order for the system 100 to communicate with the data store as well as correctly process the data, as described above. As shown in 107 of FIG. 1, when the DE 104 or the CE 112 determines the incoming data sample is adversarial, they call the designated on-demand pipeline 150. From there the ARC 120 can perform any one or more of the following actions: (1) inspecting the suspected adversarial data samples using the inspection engine 122; (2) quarantine and scrub the dataset of suspected adversarial data samples; (3) evaluating the production machine learning model's robustness towards the detected adversarial attack; (4) retraining the machine learning model to be robust against the detected adversarial attack; and (5) deploying a new version of the machine learning model (e.g., the retrained model) to the online pipeline 140 to replace the production machine learning model 110.

The functionality of the inspection engine 122 of FIG. 1 is described in more detail below. The IE 122 performs further evaluation of issues with the input data or machine learning model based on the results of the DE 104. The DE 104 handles preliminary evaluation of incoming data and determines whether the incoming data is adversarial or not, while the IE 122 is responsible for verifying suspected input adversarial data samples as indeed adversarial. The IE 122 is furthermore responsible for evaluating the suspected samples for the type of adversarial attack that the data represents.

In particular, there may be different types of adversarial attacks. The different types of adversarial attacks may be associated with different data types. For example, there are well known types of adversarial attacks for image data such as C-W and FGSM types of attacks. The term adversarial attack may cover any manipulation of data targeted at reducing the performance a machine learning model in the production online pipeline 140. The term adversary attacks is intended to cover a broad range of data manipulation not necessarily resulting in mis-prediction. An adversarial attack may represent any data manipulation with an underlying goal including but not limited to the following:

(1) confidence reduction: reducing the confidence of the model in making a classification of some data (the returned class prediction will may still be correct but if the model's confidence in that classification is significantly reduce, that data manipulation could qualify as an adversarial attack);

(2) untargeted misclassification: this is primarily to alter a machine learning model or its input dataset to produce any incorrect classification on input data sample; and (3) targeted misclassification: where the adversarial agent's goal is to misguide the machine model into switching its classification outcome to its own predefined outcome (that is objectively an incorrect classification within the context of the machine learning model's objective).

The functionalities of the model evaluator (ME) 130 within the correction engine (COE) 126 in FIG. 1 is described in more detail below. For example, the ME 130 may be designed to ensure that model performance does not degrade with respect to a data sample. If a data sample is suspected to be adversarial as determined by the DE 104, the ME 130 would function to evaluate the model's robustness against the detected adversarial attack. If the model is determined to be robust to the detected attack, no retraining is necessary. However, this doesn't mean that the data sample with detected adversarial attack would be executed through the production machine learning model 110 in the online pipeline 140 in the future just because the model is robust. If the data sample is adversarial, the main model 110 is preferably not run and further inspections may be performed on the data source. If the production machine learning model 110 is not robust to the detected attack, then the ME 130 may generate an output that triggers the model retrainer (MR) 128 for model retraining. Additionally, the ME 130 may further return output that informs the DE 104 to prevent future data that matches the profile of the detected adversarial data from reaching the model in production. Such profile of the data may be extracted by the ME 130 and sent to the DE 104 or alternatively, such profile may be extracted by the DE 104.

The functionalities of the model retrainer (MR 128) within the correction engine (COE 126) in FIG. 1 is described in more detail below. The design of the model retrainer 128 and the methodology for supplying retrained models to the online pipeline 140 (including the production machine learning model 110 and the ensemble of proxy model in CE 112) may be based on general goal of the ARC 120. In particular, the goal of the ARC 120 may include improving the model robustness against adversarial attacks. This goal may be achieved via model retraining. As described above, when a new unique adversarial attack is discovered by the DE 104 or the CE 112, the production system 100 should deploy two things from ARC 120: retrained robust model to replace the main production model 110 in the online pipeline 140 and updates to DE 104 for detection method/algorithm for detecting the identified attack in the future.

The retraining method of the machine learning model by the MR 128 may be implemented as adversarial training. For example, adversarial data samples may be proactively added to the training and test dataset and labeled accordingly. The machine learning model may be retrained using the training and testing dataset containing the adversarial data samples to correctly predict output for these adversarial data samples. As such, future new data fitting the profile of the adversarial data sample may not be mis-predicted. Such retraining may involve generation of training samples and may require domain knowledge on the dataset as well as adversarial samples of the dataset.

Alternatively or additionally, the training method of the model by the MR 125 may be implemented based on dataset cleansing. For example, data in the training dataset fitting the detected adversarial data samples may be removed. As such, the training dataset may be cleansed. The model retrained using such cleansed data may be less vulnerable to the detected type of attacks.

Alternatively or additionally, the training method of the model by the MR 128 may be implemented based on defense distillation. For example, a smoothing of the model's decision boundary may reduce possible adversarial attack exploits. A decision boundary is where a slight modification can have a large impact on the classification or other prediction for the input data. Thus, making slight adjustments to this boundary may improve model robustness without significantly degrading its confidence. In some implementations, another machine learning model may be built and included which processes the output of the target model as input and predicts what classification the target model made. This provides insight into which results are more susceptible to adversarial attacks.

Alternatively or additionally, the training method of the model by the MR 128 may be implemented based on model architecture modifications. For example, highly non-linear model architectures may be inherently more robust to adversarial attacks. Model architecture may be modified in retraining. As such, the detected adversarial attacks may be ineffective against the retrained model with a modified architecture. Such re-architecting of the model may need involvement of domain experts and data scientists.

The retrained models by the MR 128 may be used in the online pipeline 140 in various different ways. For example, when a model is retrained using one of the techniques described above, it may be deployed as either the main model in production or a proxy model among the ensemble of proxy models in CE 112 as described above in relation to FIG. 3. In the situation where the production model needs to be re-hauled, the retrained model may be deployed as an updated main production model. However if only slight changes are introduced in the retrained model, the retrained model may be deployed as a proxy model. Once deployed, such proxy model may be gradually evaluated as it is being used in the CE 112 for consistency determination. One of the proxy model may later be used to update the main production model.

The functionality of the data store and data management (DM) component 124 of the ARC in FIG. 1 is further described in more detail below. The goal of the DM 124 is to help the ARC 120 make informed decision about how to manage and deploy various model retraining and correction techniques described above and to manage the proxy models. For example, in order to perform the model retraining functions, the DM 124 may quarantine the recently input live dataset. In some implementations, each individual data may be tagged as 'adversarial' or 'clean' in addition to how the data is formatted. Such tag information may be used in the model retraining process discussed above such as adversarial retraining or retraining with data cleansing. The DM may further maintain metadata for the input data 102. The metadata, as described above, may include but are not limited to data type, data source, detected adversarial attack, and adversarial data samples. Such metadata, for example, may help inform the DE 104 and/or the IE 122 about which data sources are trustworthy.

In FIGS. 1 and 3 described above, dashed data lines 160 and 304 represents data forward paths. For example, in 160 of FIG. 1, the detection engine 104 may forward the input stream data to the data transformer 106, the production machine learning model 110 (e.g., when the optional data transformer 106 is not included), and the proxy models 302 of the consistency engine 112. For another example, the output of the data transformer 106 may be forwarded to the proxy models 302 rather than the non-transformed input data.

The disclosure above is further related to U.S. Provisional Application No. 62/856,904, filed by the same applicant of this application on Jun. 4, 2019, and U.S. Provisional Application No. 62/913,554, filed by the same applicant on Oct. 10, 2019, which are incorporated by reference in their entireties.

Figure 4:
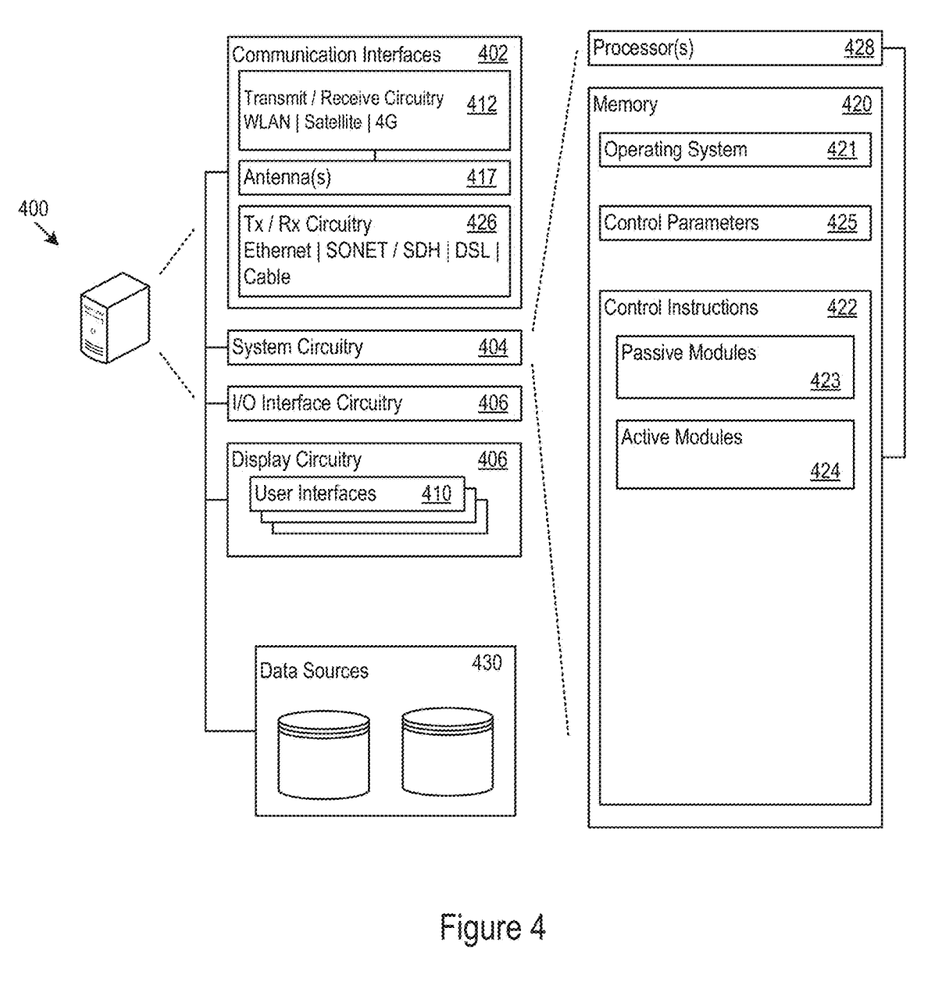
FIG. 4 shows an exemplary computer architecture for a computer device used to implement the features of the machine learning model production system and its various components.

FIG. 4 illustrates an exemplary computer architecture of a computer device 400 on which the features of the machine learning model production system and its various components are implemented for detecting adversarial attacks on a machine learning model and for adapting the machine model according to the detected adversarial attack type. The computer device 200 includes communication interfaces 402, system circuitry 404, input/output (I/O) interface circuitry 406, and display circuitry 408. The graphical user interfaces (GUIs) 410 displayed by the display circuitry 408 may be representative of GUIs generated by the machine learning model production system and its various components to, for example, receive user commands/input (e.g., user input from the interface for the on-demand pipeline). The GUIs 410 may be displayed locally using the display circuitry 408, or for remote visualization, e.g., as HTML, JavaScript, audio, and video output for a web browser running on a local or remote machine. Among other interface features, the GUIs 410 may further render displays of the various alerts of adversarial attacks, various adversarial data, and on-demand user interface.

The GUIs 410 and the I/O interface circuitry 406 may include touch sensitive displays, voice or facial recognition inputs, buttons, switches, speakers and other user interface elements. Additional examples of the I/O interface circuitry 406 includes microphones, video and still image cameras, headset and microphone input/output jacks, Universal Serial Bus (USB) connectors, memory card slots, and other types of inputs. The I/O interface circuitry 406 may further include magnetic or optical media interfaces (e.g., a CDROM or DVD drive), serial and parallel bus interfaces, and keyboard and mouse interfaces.

The communication interfaces 402 may include wireless transmitters and receivers ("transceivers") 412 and any antennas 414 used by the transmit and receive circuitry of the transceivers 412. The transceivers 412 and antennas 414 may support WiFi network communications, for instance, under any version of IEEE 802.11, e.g., 802.11n or 802.11ac, or other wireless protocols such as Bluetooth, Wi-Fi, WLAN, cellular (4G, LTE/A). The communication interfaces 402 may also include serial interfaces, such as universal serial bus (USB), serial ATA, IEEE 1394, lighting port, I2C, slimBus, or other serial interfaces. The communication interfaces 402 may also include wireline transceivers 416 to support wired communication protocols. The wireline transceivers 416 may provide physical layer interfaces for any of a wide range of communication protocols, such as any type of Ethernet, Gigabit Ethernet, optical networking protocols, data over cable service interface specification (DOCSIS), digital subscriber line (DSL), Synchronous Optical Network (SONET), or other protocol.

The system circuitry 404 may include any combination of hardware, software, firmware, APIs, and/or other circuitry. The system circuitry 404 may be implemented, for example, with one or more systems on a chip (SoC), application specific integrated circuits (ASIC), microprocessors, discrete analog and digital circuits, and other circuitry. The system circuitry 404 may implement any desired functionality of the machine learning model production system and its various components. As just one example, the system circuitry 404 may include one or more instruction processor 418 and memory 420.

The memory 420 stores, for example, control instructions 422 for executing the features of the machine learning model production system and its various components, as well as an operating system 421. In one implementation, the processor 418 executes the control instructions 422 and the operating system 421 to carry out any desired functionality for the machine learning model production system and its various components.

The computer device 400 may further include various data sources 430. Each of the databases that are included in the data sources 430 may be accessed by the machine learning model production system and its various components.

Various implementations have been specifically described. However, other implementations that include a fewer, or greater, number of features and/or components for each of the apparatuses, methods, or other embodiments described herein are also possible.

What is claimed is:

1. A machine learning model production system for a main machine learning model comprising a circuitry, the circuitry configured to:

receive a live data item from a live data stream;
configure an online pipeline of the machine learning model production system to:
   determine, using a detection engine of the online pipeline, whether the live data item is adversarial, wherein an adversarial data item is associated with an adversarial attack from the live data stream;
   execute the main machine learning model to generate a main prediction for the live data item when the detection engine determines that the live data item is not adversarial; and
   store the live data item in a data store for adversarial data items and trigger execution of an on-demand pipeline of the machine learning model production system for inspection of the live data item and for evaluation and correction of the main machine learning model when it is determined that the live data item is adversarial;
when the detection engine determines that the live data item does not contain any adversarial attack, configure a consistency engine to further execute a plurality of proxy machine learning models to generate a plurality of proxy predictions for the live data item, analyze the main prediction and the plurality of proxy predictions to generate a prediction consistency measure among the main machine learning model and the plurality of proxy machine learning models, and determine that the live data item is adversarial when the prediction consistency measure is below a predetermined consistency threshold; and
configure the on-demand pipeline of the machine learning model production system to, upon being triggered by the online pipeline:
   retrain an updated machine learning model; and
   update the online pipeline with the updated machine learning model.

2. The machine learning model production system of claim 1, wherein the plurality of proxy machine learning models comprises one or more model architectures.

3. The machine learning model production system of claim 1, wherein to update the online pipeline with the updated machine learning model comprises updating one of the plurality of proxy machine learning models with the updated machine learning model.

4. The machine learning model production system of claim 1, wherein:
the online pipeline further comprises a data transformer;
when the detection engine determines that the live data item does not contain any adversarial attack, the circuitry is further configured to transform the live data item; and
the main prediction is generated by the main machine learning model using the transformed live data item.

5. The machine learning model production system of claim 4, wherein the data transformer comprises an ensemble of data processing models each performing an independent type of data transformation.

6. The machine learning model production system of claim 4, wherein the data transformer is configured to remove potential adversarial features in the live data item.

7. The machine learning model production system of claim 1, wherein the detection engine comprises an ensemble of detection models for detecting distinct types of adversarial attacks.

8. The machine learning model production system of claim 1, wherein to update the online pipeline with the updated machine learning model comprises updating the main machine learning model with the updated machine learning model.

9. The machine learning model production system of claim 1, wherein to retrain the updated machine learning model comprises training the updated machine learning model using a training dataset that excludes the adversarial data items in the data store for adversarial data items.

10. The machine learning model production system of claim 1, wherein the circuitry is further configured to cause the on-demand pipeline to inspect the live data item to generate an adversarial label, and retrain the updated machine learning model using a training dataset including the live data item with the adversarial label.

11. A method for protecting a main machine learning model in a machine learning model production system against adversarial attacks, comprising:
receiving a live data item from a live data stream;
determine, using a detection engine of an online pipeline, whether the live data item is adversarial, wherein an adversarial data item is associated with an adversarial attack from the live data stream;
executing the main machine learning model to generate a main prediction for the live data item when the detection engine determines that the live data item is not adversarial;
storing the live data item in a data store for adversarial data items and triggering execution of an on-demand pipeline of the machine learning model production system for inspection of the live data item and for evaluation and correction of the main machine learning model when it is determined that the live data item is adversarial;
executing a plurality of proxy machine learning models to generate a plurality of proxy predictions for the live data item;
analyzing the main prediction and the plurality of proxy predictions to generate a prediction consistency measure among the main machine learning model and the plurality of proxy machine learning models;
determining that the live data item is adversarial when the prediction consistency measure is below a predetermined consistency threshold;
retraining an updated machine learning model in the on-demand pipeline; and
updating the online pipeline with the updated machine learning model.

12. The method of claim 11, wherein the plurality of proxy machine learning models comprises at least two different model architectures.

13. The method of claim 11, wherein updating the online pipeline with the updated machine learning model comprises updating one of the plurality of proxy machine learning models with the updated machine learning model.

14. The method of claim 11, further comprising:
when it is determined that the live data item does not contain any adversarial attack, transforming the live data item; and
generating the main prediction by processing the transformed live data item using the main machine learning model.

15. The method of claim 14, wherein transforming the live data item comprises transforming the live data item using an ensemble of data processing models each performing an independent type of data transformation.

16. The method of claim 14, wherein transforming the live data item further comprises removing potential adversarial features in the live data item even when the detection engine determines that the live data item does not contain any adversarial attack.

17. The method of claim 11, wherein the detection engine comprises an ensemble of detection models for detecting distinct types of adversarial attacks.

18. The method of claim 11, wherein retraining the updated machine learning model comprises training the updated machine learning model using a training dataset that excludes the adversarial data items in the data store for adversarial data items.

* * * * *